(12) United States Patent
Tanno et al.

(10) Patent No.: US 6,208,624 B1
(45) Date of Patent: Mar. 27, 2001

(54) PAGING SCHEME FOR MOBILE COMMUNICATION SYSTEM USING INCREASED PAGING CHANNEL DATA TRANSMISSION RATE

(75) Inventors: Motohiro Tanno, Yokohama; Takehiro Nakamura, Yokosuka; Seizo Onoe, Yokohama, all of (JP)

(73) Assignee: NTT Mobile Communications Network Inc., Tokyo (JP)

( * ) Notice: Subject to any disclaimer, the term of this patent is extended or adjusted under 35 U.S.C. 154(b) by 0 days.

(21) Appl. No.: 08/969,282

(22) Filed: Nov. 13, 1997

(30) Foreign Application Priority Data

Nov. 14, 1996 (JP) .................................................. 8-303245

(51) Int. Cl.⁷ ................................. H04J 3/00; H04J 3/16
(52) U.S. Cl. ......................... 370/280; 370/468; 370/335
(58) Field of Search ..................................... 370/320, 324, 370/335, 336, 342, 349, 350, 337, 347, 477, 521, 468, 280, 294; 375/200

(56) References Cited

U.S. PATENT DOCUMENTS

| | | | |
|---|---|---|---|
| 4,763,322 | * 8/1988 | Eizenhofer | 370/357 |
| 5,392,287 | * 2/1995 | Tiedemann, Jr. et al. | 370/331 |
| 5,404,355 | * 4/1995 | Raith | 370/337 |
| 5,491,718 | 2/1996 | Gould et al. | |
| 5,511,067 | * 4/1996 | Miller | 370/342 |
| 5,529,540 | * 6/1996 | Wegrzyn | 370/336 |
| 5,596,571 | * 1/1997 | Gould et al. | 370/335 |
| 5,621,723 | * 4/1997 | Walton, Jr. et al. | 375/200 |
| 5,673,259 | * 9/1997 | Quick, Jr. | 370/342 |
| 5,715,526 | * 2/1998 | Weaver, Jr. et al. | 455/126 |
| 5,914,949 | * 6/1999 | Marchetto et al. | 370/468 |

FOREIGN PATENT DOCUMENTS

| | | |
|---|---|---|
| 0 629 095 | 12/1994 | (EP) . |
| 0 681 406 | 11/1995 | (EP) . |
| 2 300 337 | 10/1996 | (GB) . |
| WO 94/29980 | 12/1994 | (WO) . |
| WO 94/29981 | 12/1994 | (WO) . |
| WO 96/10895 | 4/1996 | (WO) . |

* cited by examiner

*Primary Examiner*—Chau Nguyen
*Assistant Examiner*—Chiho Andrew Lee
(74) *Attorney, Agent, or Firm*—Oblon, Spivak, McClelland, Maier & Neustadt, P.C.

(57) ABSTRACT

A paging scheme for a mobile communication system which is capable of suppressing the power consumption of the mobile station by reducing the intermittent ratio while keeping an average time required for the paging shorter than a case of merely increasing a number of time-slots. Each base station transmits a paging channel on which a paging signal for each mobile station is transmitted at intermittent timings, where the paging channel has a data transmission rate higher than a required paging channel rate of the mobile communication system, so as to shorten a transmission time of the paging signal for each mobile station. Then, each mobile station judges a presence or absence of the paging signal for that mobile station by receiving the paging channel at these intermittent timings. The paging channel may have a data transmission rate which is variable. A number of time-slots provided in each frame of the paging channel can be increased so that an intermittent ratio at each mobile station becomes lower, without causing an increase of the average time required for the paging.

2 Claims, 12 Drawing Sheets

PAGING SCHEME FOR MOBILE COMMUNICATION SYSTEM USING INCREASED PAGING CHANNEL DATA TRANSMISSION RATE

BACKGROUND OF THE INVENTION

1. Field of the Invention

The present invention relates to a scheme for paging in a mobile communication system having a plurality of base stations provided in respective cells, where each base station is transmitting a paging channel on which a paging signal for each mobile station is transmitted at intermittent timings such that each mobile station judges a presence or absence of a paging signal for the own station by receiving the paging channel at these intermittent timings.

2. Description of the Background Art

In the cellular mobile communication system, at a time of call termination for a mobile station located within a cell of a base station, the base station carries out the paging with respect to the mobile station by using a downlink radio channel called paging channel.

Figure 1:
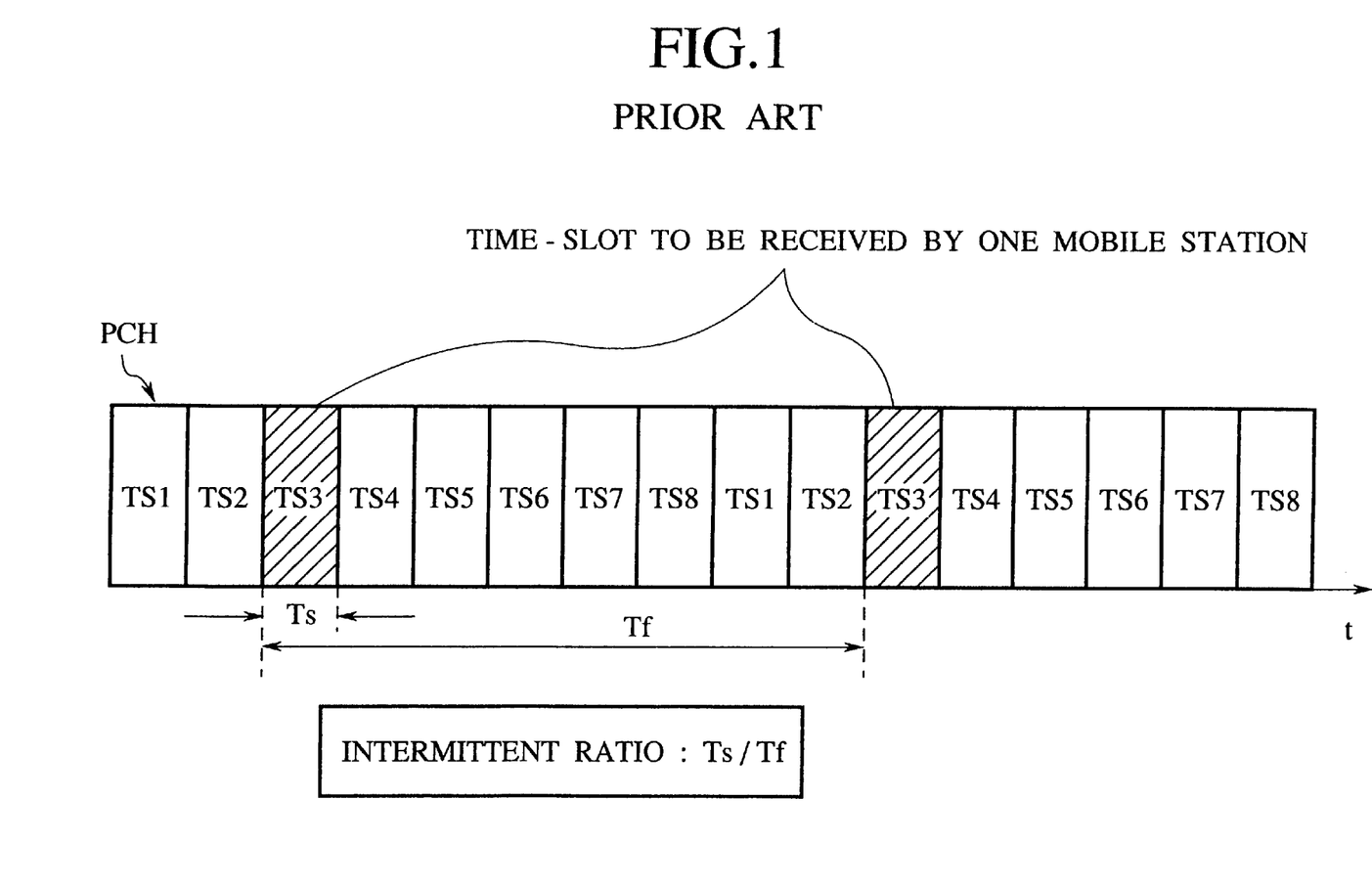
FIG. 1 is a diagram showing an exemplary paging channel according to a conventional paging scheme for a mobile communication system.

Usually, each frame of this paging channel (PCH) is divided along the time axis into a plurality of time-slots (TS) as shown in FIG. 1, where which time-slot of the paging channel frame is to be used for the paging with respect to which mobile station is determined in advance. Consequently, while waiting for a call to the own station, it suffices for the mobile station to receive only the specific time-slot of the paging channel frame intermittently and there is no need to constantly receive the paging channel.

By increasing a number of time-slots to be used, it is possible to reduce a rate (referred hereafter as an intermittent ratio) of a time period for which the mobile station actually receives the paging channel with respect to the entire time period of the paging channel frame, and consequently it is possible to reduce the power consumption at a time of call waiting by the mobile station considerably compared with a case of constantly receiving the paging channel.

In an example shown in FIG. 1, each frame of the paging channel is divided into right time-slots, and the mobile station receives only one time-slot (TS3 in an example of FIG. 1) among them at a time of call waiting. Consequently, in this example, the intermittent ratio is 1/8 so that the power consumption of the mobile station at a time of call waiting can be reduced to 1/8.

Figure 2:
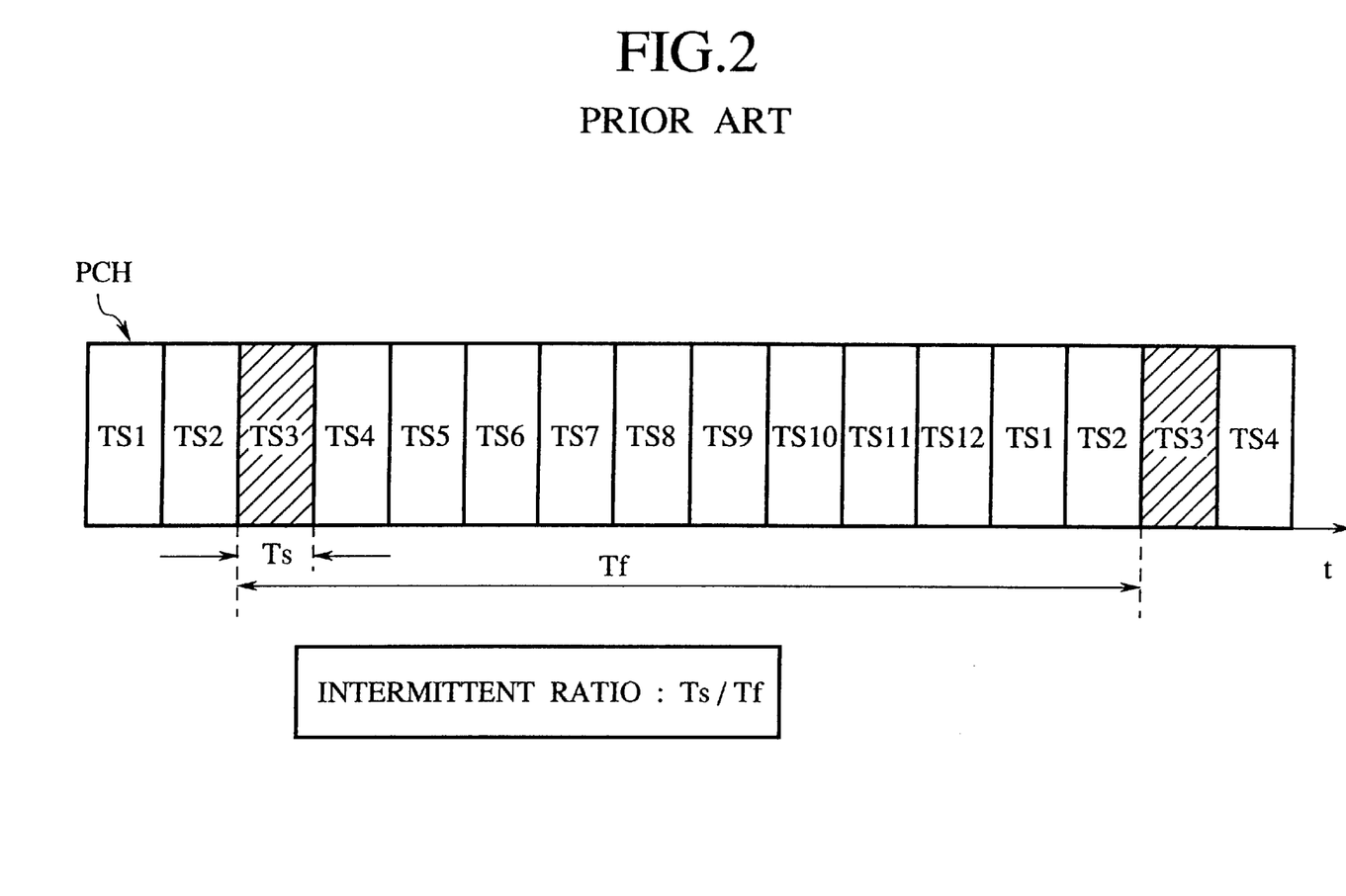
FIG. 2 is a diagram showing another exemplary paging channel according to a conventional paging scheme for a mobile communication system, in which a number of time-slots is increased.

Now, in the conventional mobile communication system, the intermittent ratio has been reduced by increasing a number of time-slots. However, when a number of time-slots is increased, the paging interval also increases as shown in FIG. 2, and consequently, an average time required for the paging is also increased so that there has been a limit to an extent by which the intermittent ratio can be reduced by the increase of a number of time-slots. In an example shown in FIG. 2, a number of time-slots is increased to twelve from eight used in FIG. 1, so that the intermittent ratio is reduced from 1/8 to 1/12, but the average time required for the paging is also increased accordingly.

It is also possible to reduce the paging interval by reducing a data amount necessary for the paging and thereby reducing a unit time-slot duration, but there is also a limit to an extent by which the data amount necessary for the paging can be reduced, so that there is also a limit to an extent by which the intermittent ratio can be reduced in this way.

SUMMARY OF THE INVENTION

It is therefore an object of the present invention to provide a paging scheme for a mobile communication system which is capable of suppressing the power consumption of the mobile station by reducing the intermittent ratio while keeping an average time required for the paging shorter than a case of merely increasing a number of time-slots. In short, this is realized in the present invention by using a higher data transmission rate for the paging channel so as to reduce a unit time-slot duration and then increasing a number of time-slots.

According to one aspect of the present invention there is provided a method of paging in a mobile communication system having a plurality of base stations provided in respective cells and mobile stations, comprising the steps of: transmitting from each base station radio channels in a plurality of different data transmission rates, the radio channels including a paging channel on which a paging signal for each mobile station is transmitted at intermittent timings, the paging channel having a data transmission rate which is higher than a required paging channel rate of the mobile communication system, so as to shorten a transmission time of the paging signal for each mobile station; and judging at each mobile station a presence or absence of the paging signal for said each mobile station by receiving the paging channel at said intermittent timings.

According to another aspect of the present invention there is provided a base station device for use in a mobile communication system having a plurality of base stations provided in respective cells and mobile stations, comprising: a communication channel transmission unit for transmitting communication channels; and a control channel transmission unit for transmitting control channels in a plurality of different data transmission rates, the control channels including a paging channel on which a paging signal for each mobile station is transmitted at intermittent timings, the paging channel having a data transmission rate which is higher than a required paging channel rate of the mobile communication system, so as to shorten a transmission time of the paging signal for each mobile station.

According to another aspect of the present invention there is provided a mobile station device for use in a mobile communication system having a plurality of base stations provided in respective cells and mobile stations, comprising: a receiving unit for receiving signals from each base station, including a paging signal for each mobile station transmitted on a paging channel at intermittent timings, the paging channel being transmitted by each base station at a data transmission rate which is higher than a required paging channel rate of the mobile communication system; and a control unit for judging a presence or absence of the paging signal for said mobile station device by controlling the receiving unit to receive the paging channel at said intermittent timings according to the data transmission rate of the paging channel.

According to another aspect of the present invention there is provided a method of paging in a mobile communication system having a plurality of base stations provided in respective cells and mobile stations, comprising the steps of: transmitting from each base station radio channels in a plurality of different data transmission rates, the radio channels including a paging channel on which a paging signal for each mobile station is transmitted at intermittent timings, the paging channel having a data transmission rate which is variable; and judging at each mobile station a presence or absence of the paging signal for said each mobile station by receiving the paging channel at said intermittent timings.

According to another aspect of the present invention there is provided a base station device for use in a mobile communication system having a plurality of base stations provided in respective cells and mobile stations, comprising: a communication channel transmission unit for transmitting communication channels; and a control channel transmission unit for transmitting control channels in a plurality of different data transmission rates, the control channels including a paging channel on which a paging signal for each mobile station is transmitted at intermittent timings, the paging channel having a data transmission rate which is variable.

According to another aspect of the present invention there is provided a mobile station device for use in a mobile communication system having a plurality of base stations provided in respective cells and mobile stations, comprising: a receiving unit for receiving signals from each base station, including a paging signal for each mobile station transmitted on a paging channel at intermittent timings, the paging channel being transmitted by each base station at a data transmission rate which is variable; and a control unit for judging a presence or absence of the paging signal for said mobile station device by controlling the receiving unit to receive the paging channel at said intermittent timings according to the data transmission rate of the paging channel.

Other features and advantages of the present invention will become apparent from the following description taken in conjunction with the accompanying drawings.

DETAILED DESCRIPTION OF THE PREFERRED EMBODIMENTS

Referring now to FIG. 3 to FIG. 9, a first embodiment of a paging scheme for a mobile communication system according to the present invention will be described in detail.

Figure 3:
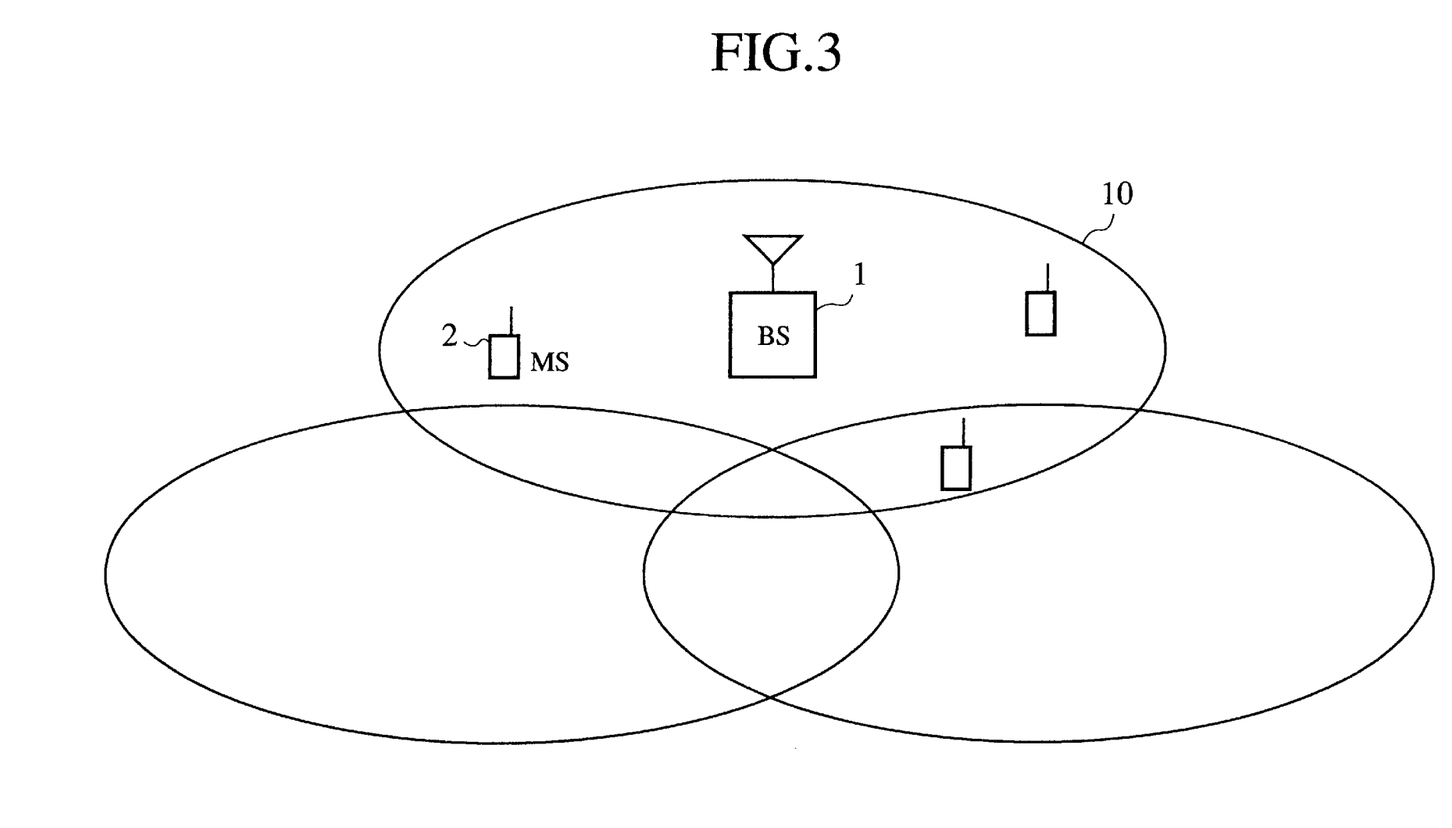
FIG. 3 is a schematic diagram showing an exemplary configuration of a mobile communication system to which the paging scheme of the present invention is applied.

FIG. 3 shows an exemplary overall configuration of a mobile communication system used in the present invention, in which a base station (BS) 1 is provided in its cell 10, and communicating with a mobile station (MS) 2 located within the cell 10.

Figure 4:
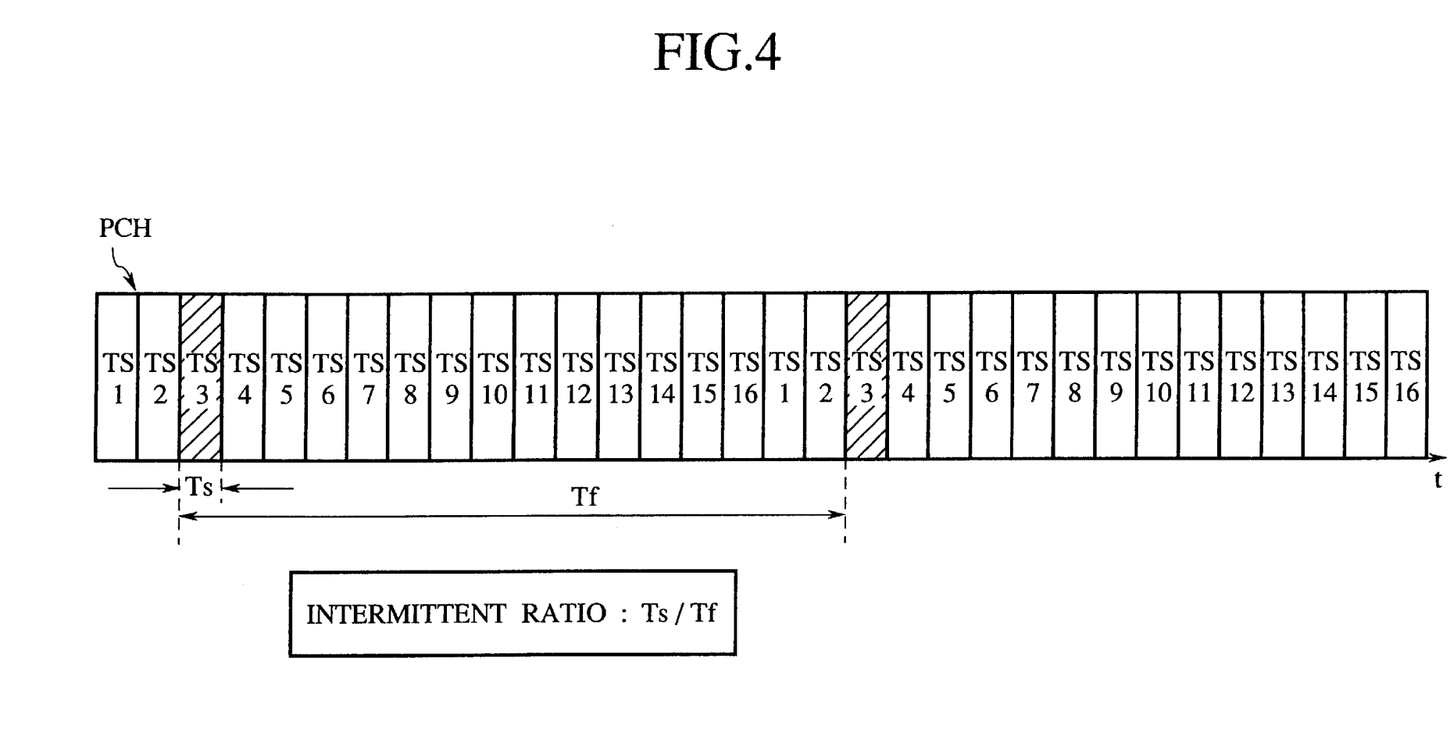
FIG. 4 is a diagram showing an exemplary paging channel used in the first embodiment of the paging scheme according to the present invention.

In this mobile communication system, the base station 1 transmits a paging channel (PCH) having a plurality of time-slots as shown in FIG. 4.

At a time of call termination for the mobile station 2 located within the cell 10 of the base station 1, the base station 2 carries out the paging with respect to the mobile station 2 by using this paging channel of FIG. 4. Each frame of this paging channel (PCH) is divided along the time axis into a plurality of time-slots (TS) as shown in FIG. 4, where which time-slot of the paging channel is to be used for the paging with respect to which mobile station is determined in advance. Consequently, at a time of call waiting, it suffices for the mobile station 2 to receive only the specific time-slot (the time-slot TS3 in FIG. 4) of the paging channel frame intermittently, so that the power consumption of the mobile station 2 at a time of call waiting can be reduced considerably.

Here, the power consumption of the mobile station 2 at a time of call waiting can be further reduced by reducing the intermittent ratio. In this regard, in the conventional TDMA mobile communication system, all the radio channels transmitted by the base station are in the same data transmission rate, so that the intermittent ratio has been reduced by increasing a number of time-slots. However, when the radio channels using various data transmission rates can be transmitted and received easily as in a case of the CDMA mobile communication system, it is more advantageous to reduce the intermittent ratio by increasing the data transmission rate of the paging channel.

In view of this, the paging channel of FIG. 4 uses the data transmission rate higher than that of the conventional case shown in FIG. 1, so that a unit time-slot duration for the same data amount is shorter in FIG. 4 compared with FIG. 1. Consequently, even when a number of time-slots is increased, an average time required for the paging is shorter compared with a case of a straightforward increase of a number of time-slots without using the higher data transmission rate as shown in FIG. 2.

In an example shown in FIG. 4, a number of time-slots is increased to sixteen, which is twice as much as that in a case of FIG. 1, so that the intermittent ratio is reduced to 1/16. On the other hand, in FIG. 4, a unit time-slot duration is reduced to 1/2 compared with a case of FIG. 1, so that the average time required for the paging is nearly the same as in a case of FIG. 1, and therefore this case of FIG. 4 is superior to the conventional case of FIG. 2 in this regard.

Figure 5:
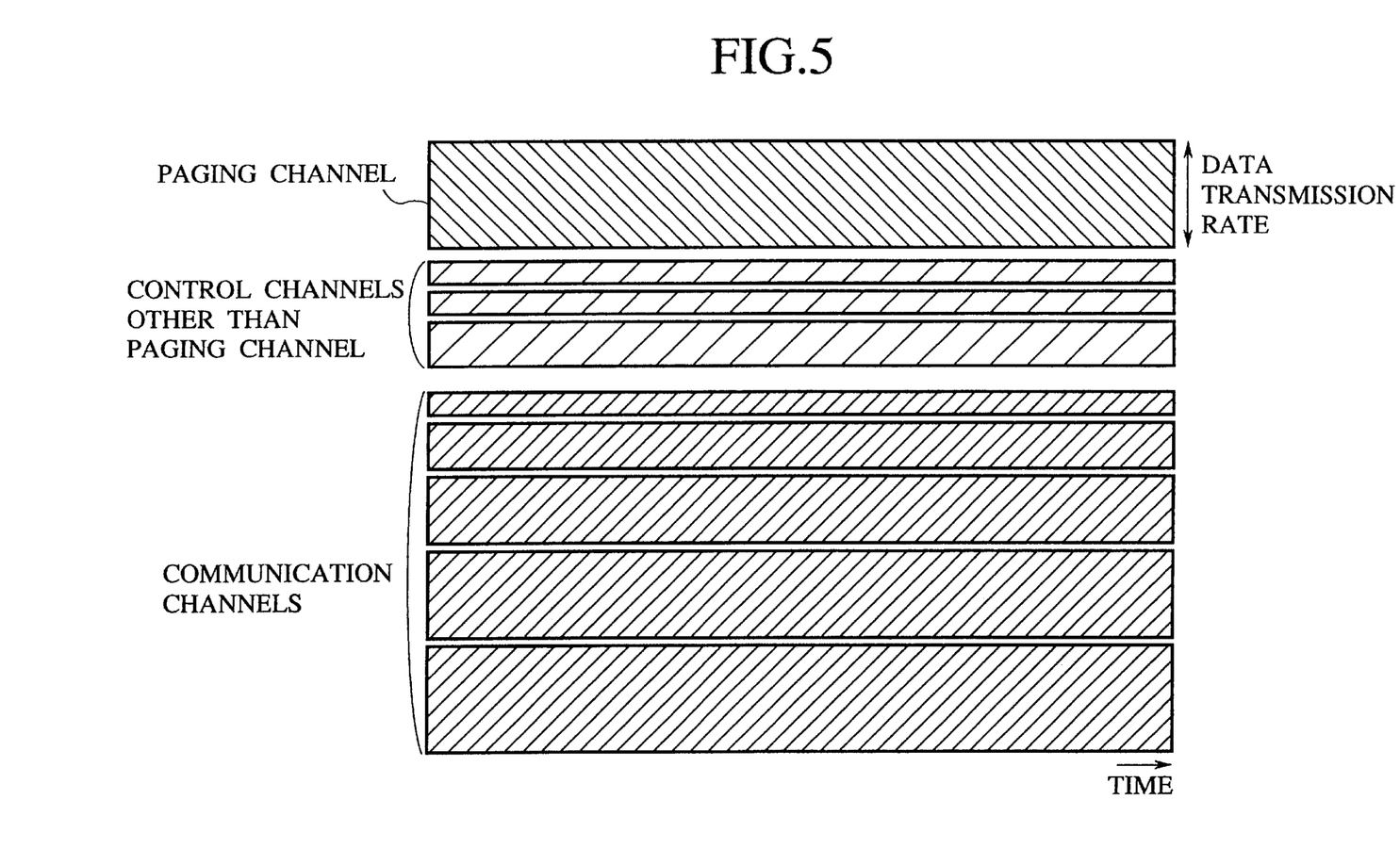
FIG. 5 is a schematic diagram showing an exemplary channel configuration used in the first embodiment of the paging scheme according to the present invention.

FIG. 5 shows an exemplary channel configuration in the mobile communication system. As shown in FIG. 5, the mobile communication system generally has radio channels with various data transmission rates, and a channel with the highest data transmission rate among them is allocated to the paging channel in this embodiment.

Figure 6:
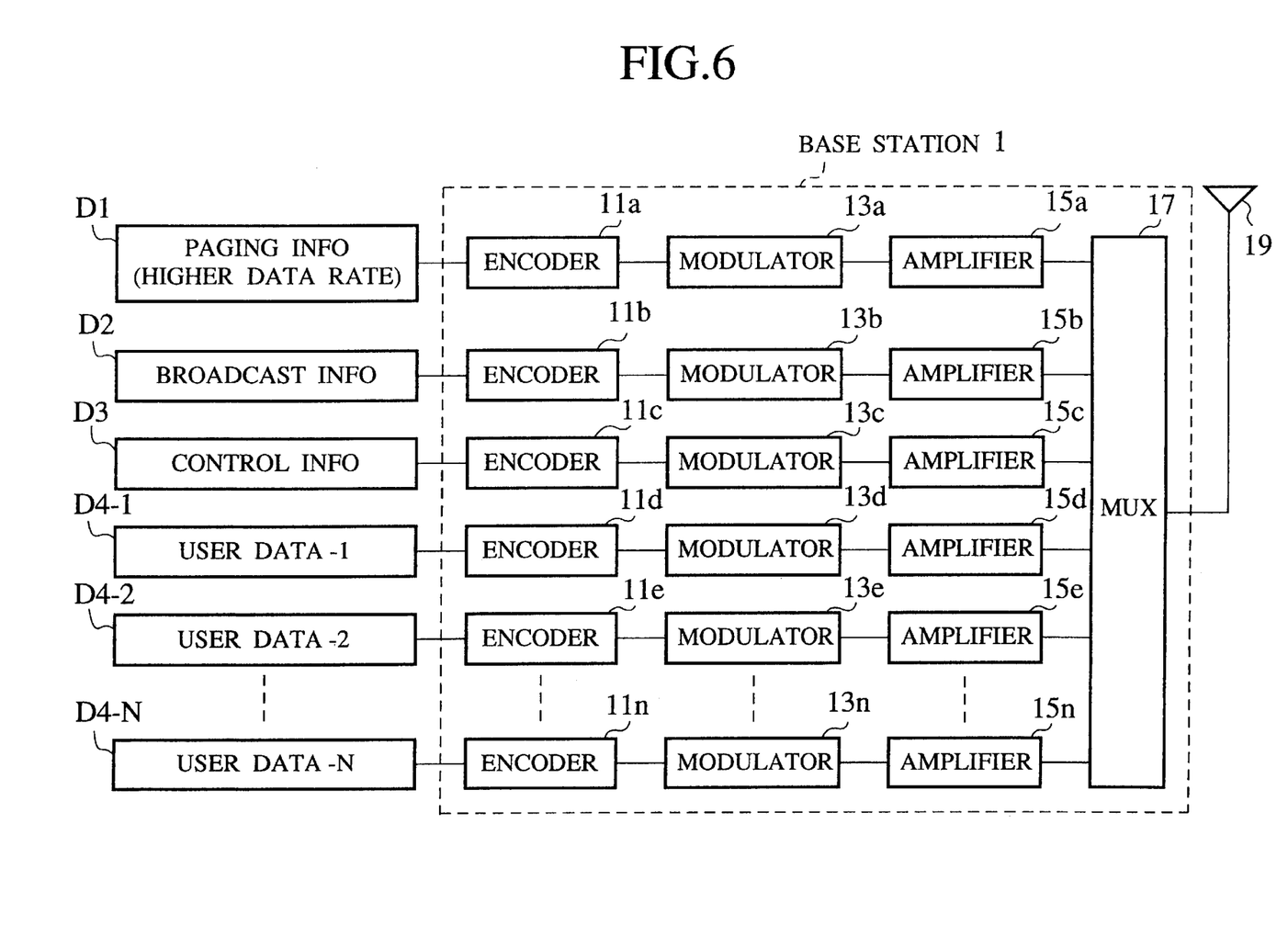
FIG. 6 is a block diagram showing an exemplary configuration of a base station in the first embodiment of the paging scheme according to the present invention.

FIG. 6 shows an exemplary internal configuration of the base station 1 in this embodiment, which comprises: a plurality of encoders 11 (11a to 11n) for respectively encoding paging information D1 (with a higher data rate), a broadcast information D2, a control information D3, and user data D4 (user data-1 D4-1 to user data-N D4-N) which are inputs of the base station 1; a plurality of modulators 13 (13a to 13n) for modulating respective encoded data; a plurality of amplifiers 15 (15a to 15n) for amplifying respective modulated signals; a multiplexer (MUX) 17 for multiplexing the modulated signals; and an antenna 19 for transmitting the multiplexed signals.

Here, the encoders 11 and the modulators 13 are capable of realizing a plurality of different data transmission rates so that this base station 1 can transmit radio channels in a plurality of different data transmission rates.

In this configuration of FIG. 6, the paging information to be transmitted by the paging channel is entered with a data rate higher than the other control information of the other control channels and the user data of the communication channel (the traffic channel). Consequently, the data transmission rate of the paging channel becomes higher, and as a result, the intermittent ratio of the intermittent reception by the mobile station 2 is made smaller.

Figure 7:
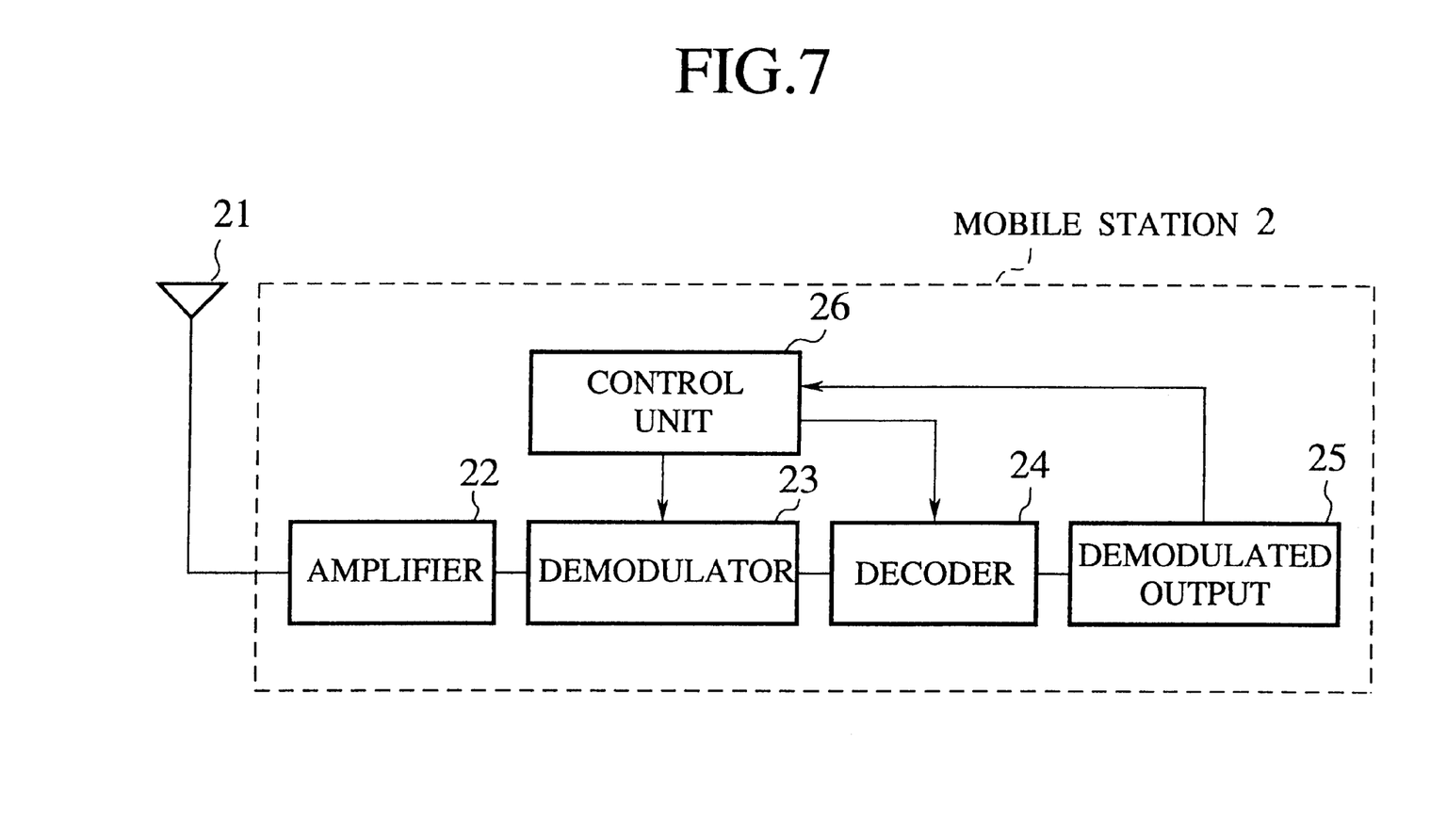
FIG. 7 is a block diagram showing an exemplary configuration of a mobile station in the first embodiment of the paging scheme according to the present invention.

FIG. 7 shows an exemplary internal configuration of the mobile station 2 in this embodiment, which comprises: an antenna 21 for receiving signals from the base station 1; an amplifier 22 for amplifying the received signals; a demodulator 23 for demodulating the amplified signals: a decoder 24 for decoding the demodulated signals to obtain a demodulated output 25; and a control unit 26 for controlling the demodulator 23 and the decoder 24 according to the demodulated output 25.

In this configuration of FIG. 7 the control unit 26 first controls the demodulator 23 and the decoder 24 into states suitable for receiving the paging channel according to the higher data transmission rate of the paging channel. Then, when the paging signal is detected in the demodulated output 25, the control unit 26 controls the demodulator 23 and the decoder 24 into states suitable for receiving the control channels and the communication channels according to the data transmission rates of the control channels and the communication channels.

Here, as the higher transmission rate of the paging channel, the maximum transmission rate available in the system can be used for the maximum effect. However, when there is a limitation on the higher transmission rate for the paging channel due to the system requirement, it is still possible to expect the similar effect by using the highest data transmission rate that can be used for the paging channel according to the system requirement.

Such a limitation on the higher transmission rate for the paging channel due to the system requirement may arise, for example, as follows. Namely, when the data transmission rate of the paging channel is raised to be N times higher, there is a need to increase the transmission power N times in order to obtain the same receiving quality as before the data transmission rate is raised. However, the increase of the transmission power can lead to a transmission device in a larger scale, so that there is a limit to an extent by which the transmission power can be increased, and consequently there arises a limitation on the higher data transmission rate for the paging channel due to such a system requirement.

Note that, in this embodiment, it is also possible to expect the similar effect by using the data transmission rate for the paging channel which is higher than an average value of all the data transmission rates that can be used in the system.

In general, according to the present invention, it is possible to expect the similar effect by using the data transmission rate for the paging channel which is higher than a required paging channel rate of the mobile communication system.

On the other hand, in a case of applying the paging scheme of the present invention to a CDMA mobile communication system, the higher data transmission rate for the paging channel can be realized by setting the spreading factor (a ratio of spreading chip rate with respect to information bit rate, which is also referred to as a process gain) for the paging channel lower than that for the other channels appropriately, without enlarging the occupied frequency bandwidth.

Figure 8:
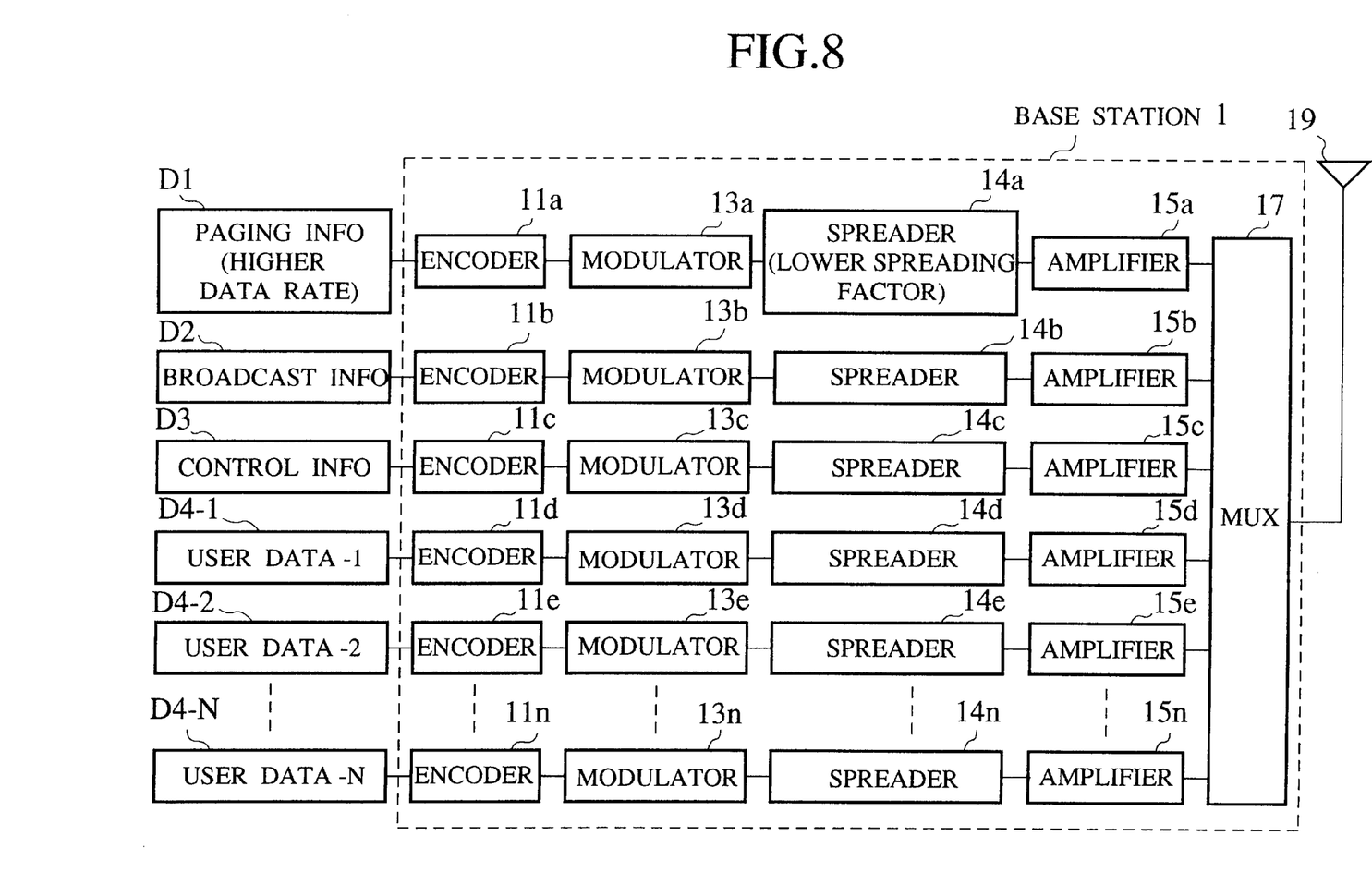
FIG. 8 is a block diagram showing another exemplary configuration of a base station in the first embodiment of the paging scheme according to the present invention, for a case of CDMA system.

More specifically, in this CDMA case, the base station 1 has an exemplary internal configuration as shown in FIG. 8, which differs from FIG. 6 in that a plurality of spreaders 14 (14a to 14n) for spreading the respective modulated signals are provided between the modulators 13 and the amplifiers 15, where the spreader 14a for the paging channel is set to have a lower spreading factor than the other spreaders.

Figure 9:
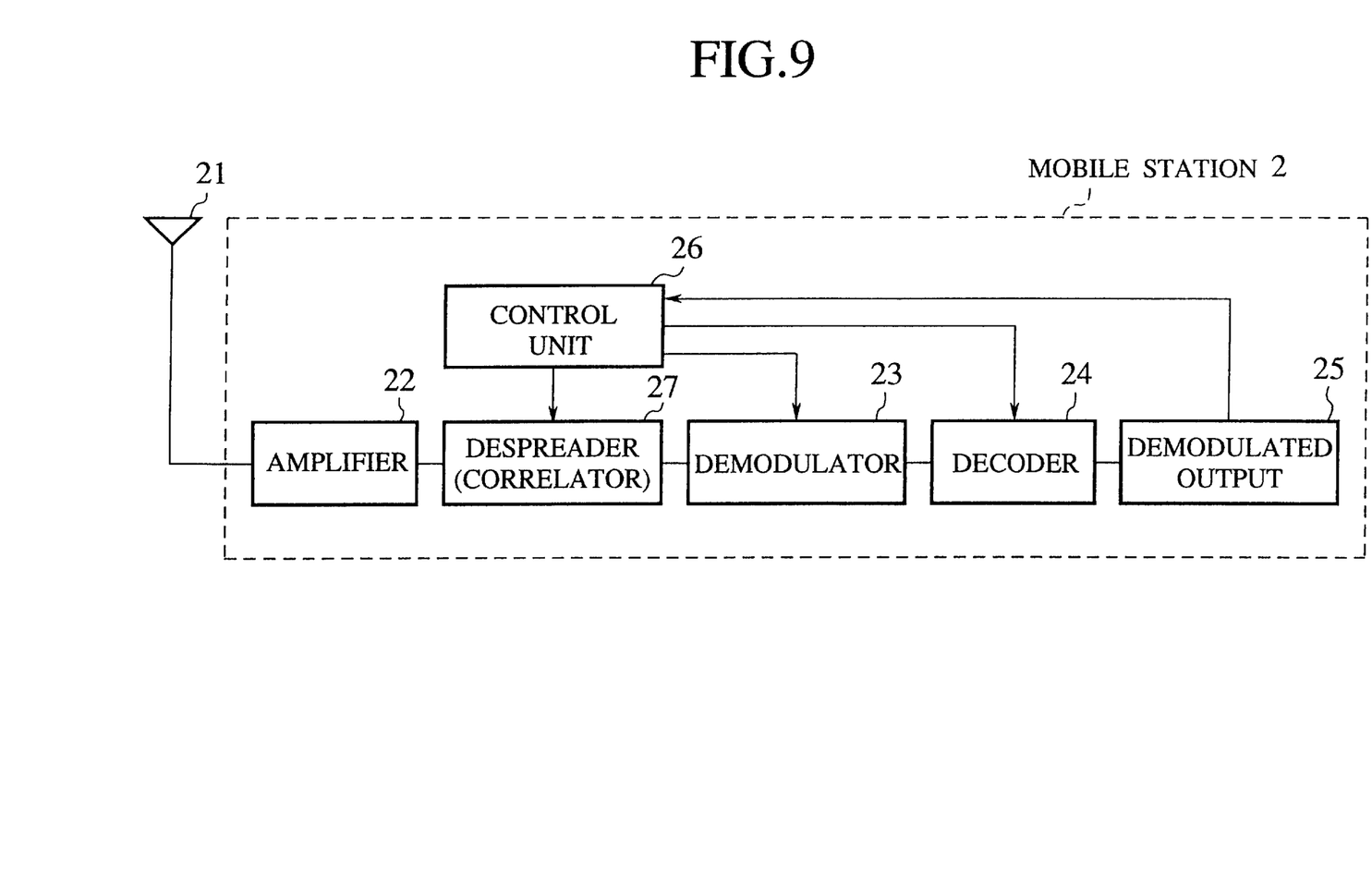
FIG. 9 is a block diagram showing another exemplary configuration of a mobile station in the first embodiment of the paging scheme according to the present invention, for a case of CDMA system.

Also, in this CDMA case, the mobile station 2 has an exemplary internal configuration as shown in FIG. 9, which differs from FIG. 7 in that a despreader (correlator) 27 for despreading the amplified signals is provided between the amplifier 22 and the demodulator 23 and this despreader 27 is also controlled by the control unit 26 according to the demodulated output 25.

Figure 10:
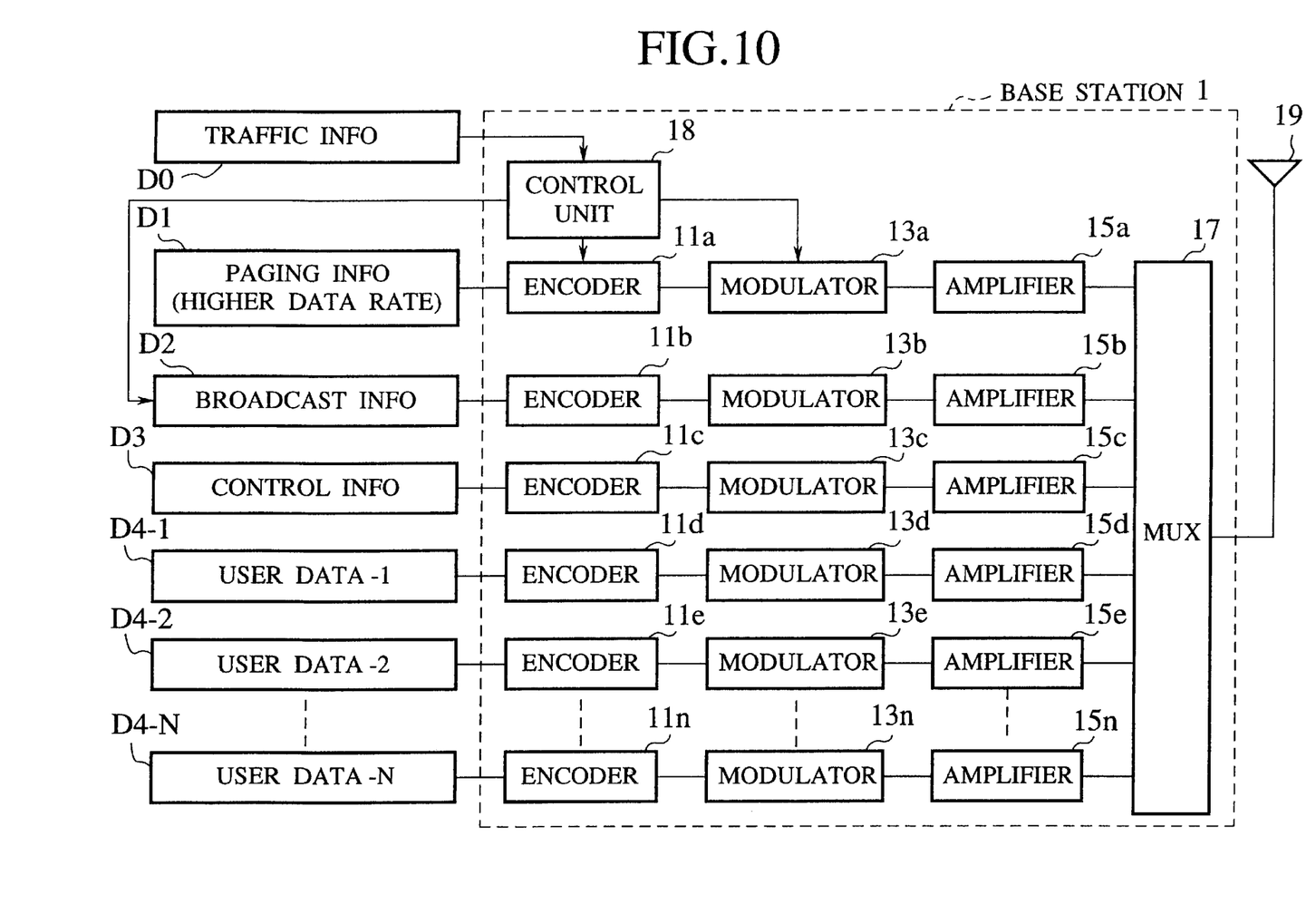
FIG. 10 is a block diagram showing an exemplary configuration of a base station in the second embodiment of the paging scheme according to the present invention.
Figure 11:
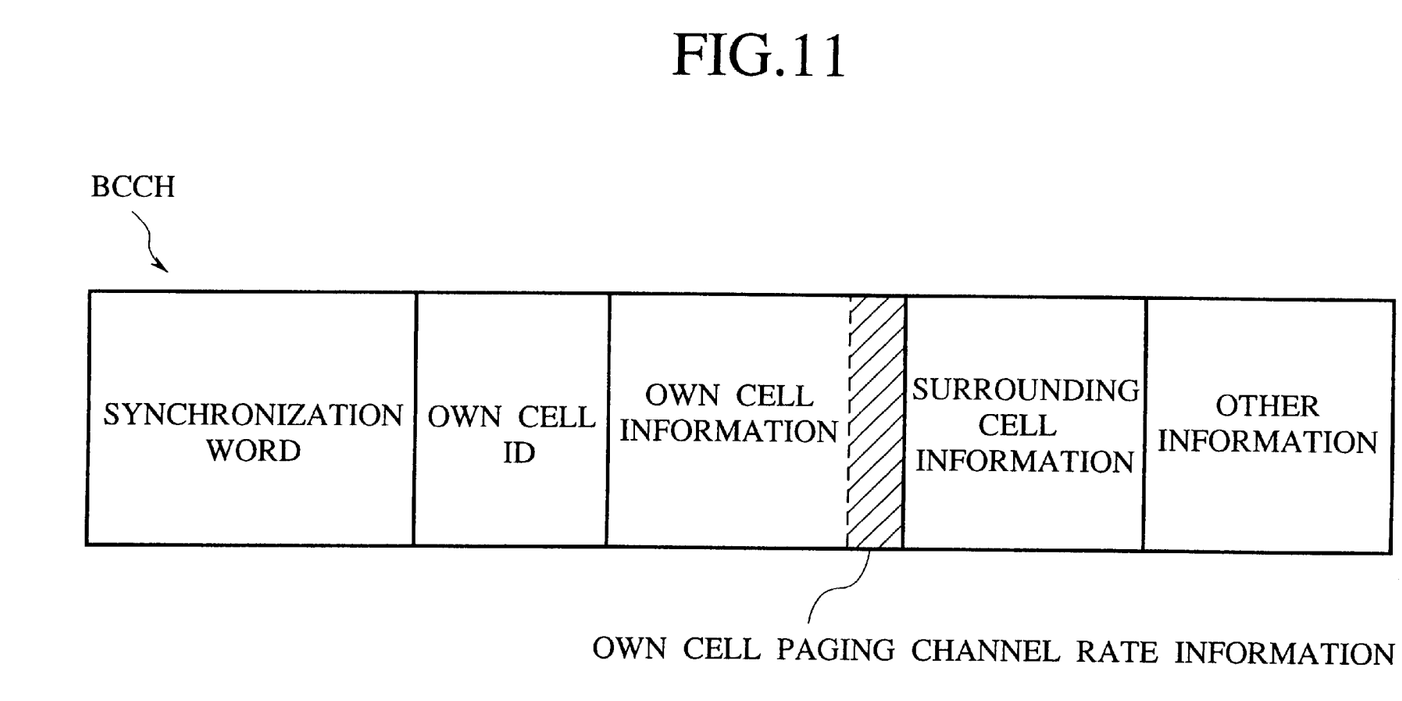
FIG. 11 is a diagram showing an exemplary broadcast channel used in the second embodiment of the paging scheme according to the present invention.
Figure 12:
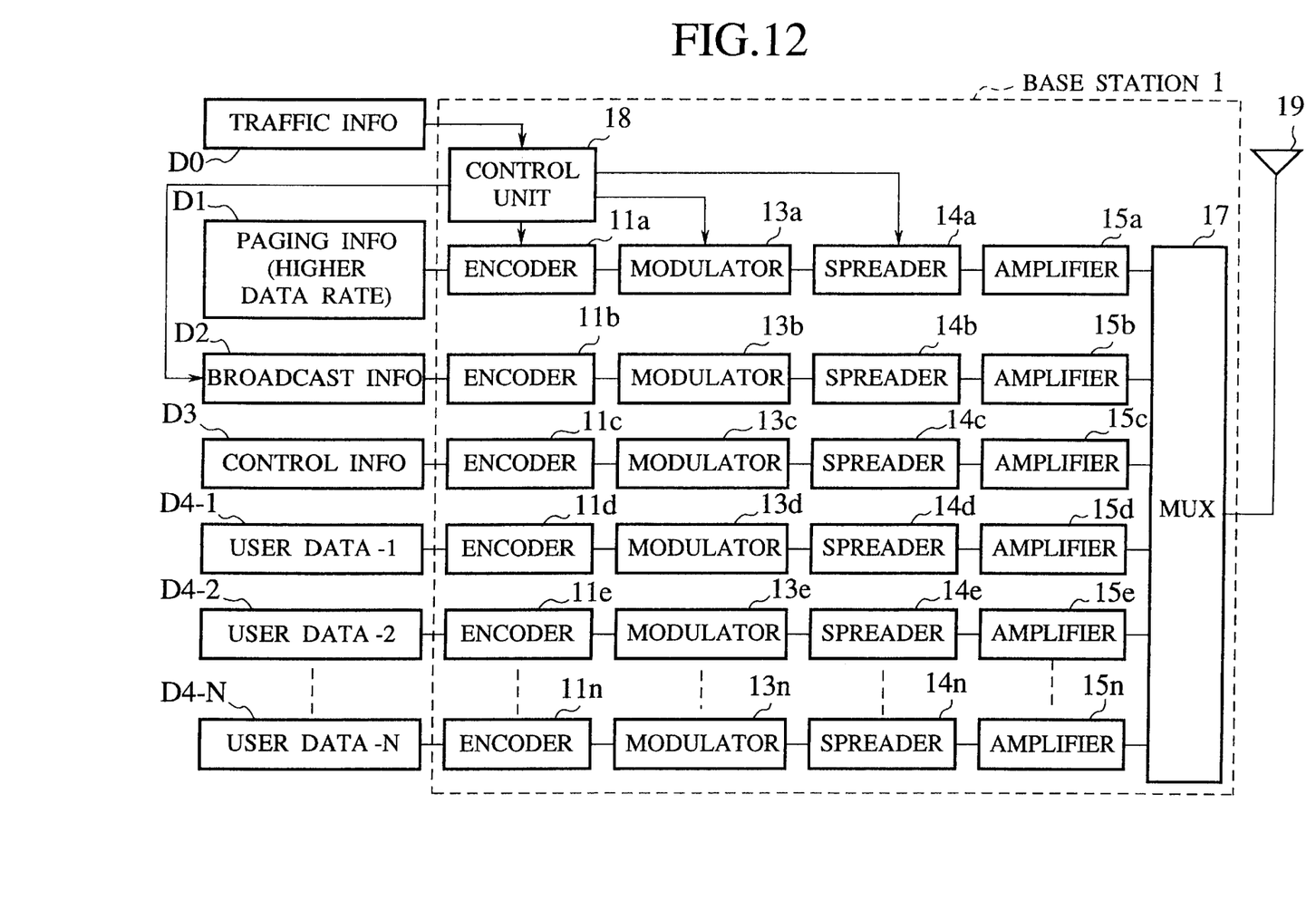
FIG. 12 is a block diagram showing another exemplary configuration of a base station in the second embodiment of the paging scheme according to the present invention, for a case of CDMA system.

Referring now to FIG. 10 to FIG. 12, a second embodiment of a paging scheme for a mobile communication system according to the present invention will be described in detail.

This second embodiment differs from the first embodiment described above in that the data transmission rate of the paging channel is made variable.

In this case, the base station 1 has an exemplary internal configuration as shown in FIG. 10, which differs from FIG. 6 in that there is also provided a control unit 18 which controls the encoder 11a and the modulator 13a and generates a broadcast information D2 according to a traffic information D0, so as to realize the variable data transmission rate for the paging channel.

In this configuration of FIG. 10, the control unit 18 controls the encoder 11a and the modulator 13a according to the desired data transmission rate of the paging channel, while at the same time, generates the broadcast information including an information on the data transmission rate of the paging channel which is to be transmitted by the broadcast channel. More specifically, as shown in FIG. 11, the broadcast channel (BCCH) transmitted by the base station 1 includes, for example, a synchronization word to be used in establishing the frame synchronization, an own cell ID, own cell information (such as traffic state, frequencies or codes of various control channels, etc. of the own cell), surrounding cell information (such as traffic state, frequencies or codes of various control channels, etc., of the surrounding cells), and other information, where the own cell information also contains an own cell paging channel rate information indicating the data transmission rate of the paging channel used in the cell of this base station.

As for the manner of controlling the data transmission rate of the paging channel by the control unit 18 of each base station, the following scheme can be adopted, for example.

(1) A system operator initially sets a prescribed data transmission rate for the paging channel.

(2) Then, the data transmission rate is changed according to a frequency of paging operations at each base station. For example, the data transmission rate can be set higher when the paging operations are required more frequently.

(3) Also, the data transmission rate is changed according to a utilization state of the communication channels at each base station. For example, the data transmission rate can be set lower when a number of communication channels in use is large, in order to reduce the interference due to the paging channel.

In order to realize the control of (2) and (3), it is necessary to provide the traffic information such as a number of paging operations, a number of communication channels in use, etc. as an input to the control unit 18 as described above.

It is also possible to applying the paging scheme of this second embodiment to a CDMA mobile communication system, similarly as in a case of the first embodiment. In such a case, the higher data transmission rate for the paging channel can be realized by controlling the spreading factor for the paging channel to be lower than that for the other channels appropriately, without enlarging the occupied frequency bandwidth.

More specifically, in this CDMA case, the base station 1 has an exemplary internal configuration as shown in FIG. 12, which differs from FIG. 10 in that a plurality of spreaders 14 (14a to 14n) for spreading the respective modulated signals are provided between the modulators 13 and the amplifiers 15, where the spreader 14a for the paging channel is controlled to have a lower spreading factor than the other spreaders by the control unit 18.

Note that, in this second embodiment, the mobile station 2 can have substantially the same configuration as that of FIG. 7 (or FIG. 9 in a case of CDMA), except that the control unit 26 controls the demodulator 23 and the decoder 24 into states suitable for receiving the broadcast channel first so as to obtain the paging channel rate information, and then controls the demodulator 23 and the decoder 24 into states suitable for receiving the paging channel according to the data transmission rate of the paging channel indicated by this paging channel rate information. Thereafter the operation in the mobile station 2 is the same as in the first embodiment.

As described, according to the present invention, it is possible to provide a paging scheme for a mobile communication system which is capable of suppressing the power consumption of the mobile station by reducing the intermittent ratio while keeping an average time required for the paging shorter than a case of merely increasing a number of time-slots, by using a higher data transmission rate for the paging channel so as to reduce a unit time-slot duration and then increasing a number of time-slots. In this manner, a number of time-slots provided in each frame of the paging channel can be increased so that an intermittent ratio at each mobile station becomes lower, without causing an increase of the average time required for the paging.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of paging in a mobile communication system having a plurality of base stations provided in respective cells and mobile stations, comprising the steps of:

transmitting from each base station radio channels in a plurality of different data transmission rates, the radio channels including a paging channel on which a paging signal for each mobile station is transmitted at intermittent timings, the paging channel having a data transmission rate which is variably changed according to at least one of a frequency of paging operations and a utilization state of communication channels at each base station; and determining at each mobile station a presence or absence of the paging signal for said each mobile station by receiving the paging channel at said intermittent timings.

2. A base station device for use in a mobile communication system having a plurality of base stations provided in respective cells and mobile stations, comprising:

a communication channel transmission unit configured to transmit communication channels; and a control channel transmission unit for transmitting control channels in a plurality of different data transmission rates, the control channels including a paging channel on which a paging signal for each mobile station is transmitted at intermittent timings, the paging channel having a data transmission rate which is variably changed according to at least one of a frequency of paging operations and a utilization state of communication channels.

* * * * *